US00RE34829E

United States Patent [19]

Stone

[11] E Patent Number: Re. 34,829

[45] Reissued Date of Patent: Jan. 17, 1995

[54] FOOD PACKAGE FOR USE IN A MICROWAVE OVEN

[75] Inventor: James L. Stone, Grand Rapids, Mich.

[73] Assignee: Packaging Corporation of America, Evanston, Ill.

[21] Appl. No.: 944,475

[22] Filed: Sep. 14, 1992

Related U.S. Patent Documents

Reissue of:

[64] Patent No.: 4,866,232
Issued: Sep. 12, 1989
Appl. No.: 178,243
Filed: Apr. 6, 1988

U.S. Applications:

[62] Division of Ser. No. 934,701, Aug. 24, 1992, abandoned.

[51] Int. Cl.[6] ..... H05B 6/80

[52] U.S. Cl. ..... 219/730; 219/759; 219/728; 426/107; 426/243; 126/390; 99/DIG. 14

[58] Field of Search ..... 219/10.55 E, 10.55 F, 219/10.55 R, 10.55 M, 730, 759, 728; 426/107, 111, 113, 234, 241, 243; 126/390; 99/DIG. 14

[56] References Cited

U.S. PATENT DOCUMENTS

| | | | |
|---|---|---|---|
| 3,302,632 | 2/1967 | Fichtner | 219/729 |
| 3,353,968 | 11/1967 | Krajewski | 219/730 |
| 3,865,301 | 2/1975 | Pothier et al. | 219/729 |
| 4,230,924 | 10/1980 | Brastad et al. | 219/730 |
| 4,267,420 | 5/1981 | Brastad | 219/730 |
| 4,518,651 | 5/1985 | Wolf, Jr. | 219/730 |
| 4,641,005 | 2/1987 | Seiferth | 219/730 |
| 4,656,325 | 4/1987 | Keefer | 219/728 |
| 4,662,969 | 5/1987 | Wang et al. | 219/759 |
| 4,676,857 | 6/1987 | Scharr et al. | 219/730 |
| 4,763,790 | 8/1988 | McGeehins | 206/557 |
| 5,308,945 | 5/1994 | VanHandel et al. | 219/730 |

*Primary Examiner*—Philip H. Leung
*Attorney, Agent, or Firm*—Leydig, Voit & Mayer, Ltd.

[57] ABSTRACT

A food package is provided wherein the accommodated food product, while remaining in the package, may be heated or cooked in a microwave oven. The food product has at least one predetermined portion thereof which requires enhanced heat while the product is being heated or cooked in the oven. The food package includes a container formed of heat resistant material which is pervious to the microwaves. A surface of the container is provided with an area which is in proximity to the predetermined portion of the food product requiring the enhanced heat. A metallized ink, consisting of metal particles suspended in an ink-like substance, is deposited on the surface area of the container. Thus, when the metallized ink is exposed to the generated microwaves, the required enhanced heat is produced in the vicinity of the surface area.

11 Claims, 3 Drawing Sheets

FIG. 9
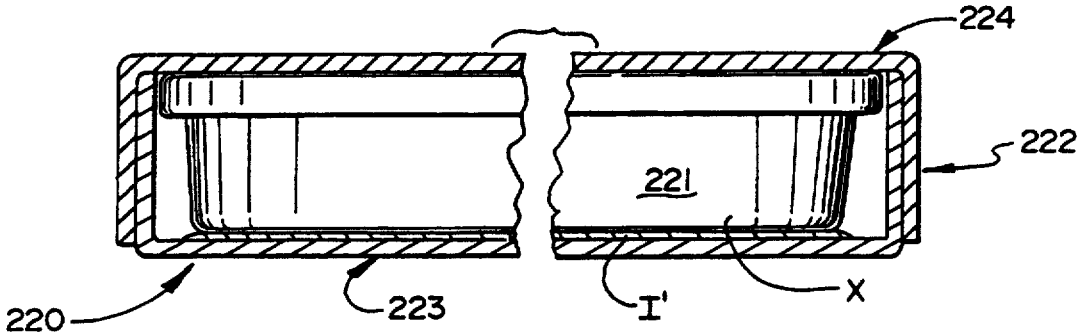
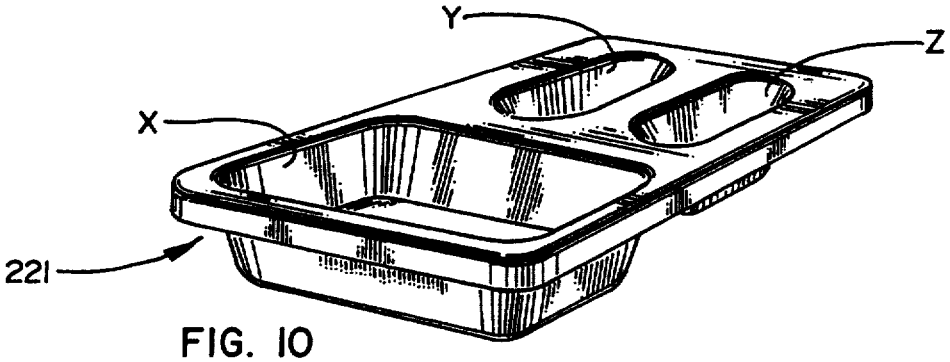
FIG. 10
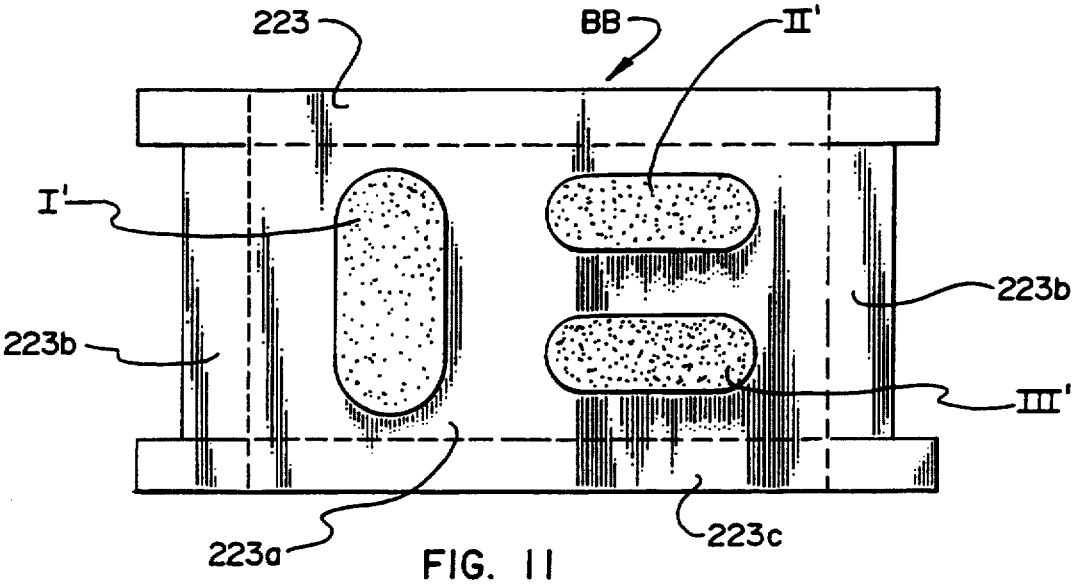
FIG. 11

FOOD PACKAGE FOR USE IN A MICROWAVE OVEN

Matter enclosed in heavy brackets [ ] appears in the original patent but forms no part of this reissue specification; matter printed in italics indicates the additions made by reissue.

*This is a division of copending application Ser. No. 07/934,701, filed on Aug. 24, 1992, now abandoned, which is an application for reissue of James L. Stone U.S. Pat. No. 4,866,232, which is in turn based on application Ser. No. 07/178,243, filed Apr. 6, 1988.*

BACKGROUND OF THE INVENTION

The use of microwave energy in both domestic and commercial establishments has become increasingly popular in the preparation of various food products. Where the food product is initially in a frozen state, thawing heating and/or cooking thereof can be readily expedited and at a low cost by utilizing such energy and at the same time enhancing the taste and nutritional value of the product. The time required to properly prepare the food product by utilizing microwave energy will depend upon a variety of factors, such as the product size and configuration; its density and consistency, and dielectric properties. Furthermore, in many instances in order to enhance its esthetic or visual appeal, it is necessary to brown or crisp the exterior of the food product or at least a portion thereof. Where the food product is a composite of various ingredients, it is sometimes necessary that certain of the ingredients requires enhanced heat during a given cooking or heating cycle within the microwave oven. To effect such heating variations, the receptacle or package in which the product is disposed during the cooking or heating cycle, may have certain areas thereof provided with means for reflecting the microwaves and thus shielding the adjacent portion of the food product therefrom and reducing the external and internal heat thereof. In other instances means can be provided at certain locations and areas of the receptacle or package wherein the microwaves are absorbed to a greater extend thereby generating surface areas of enhanced heat. Such variable heat requirements are particularly important where the receptacle or package segregates the various food products into contiguous compartments, such as occurs in various frozen TV dinners presently available on the market.

Heretofore difficulty has been experienced in economically producing a package or receptacle which meets the aforenoted heating requirements and is capable of withstanding extreme temperature variations such as occurs with microwavable frozen food products. Such prior packages frequently required various heat enhancing inserts which complicated the formation and setup of the package and caused the initial cost thereof to be inordinately high.

In other prior packages and receptacles of this general type, patches or layers of metallized film are laminated on the blanks of paperboard utilized in forming the package or receptacle components. Such metallized film is expensive; available from only a limited number of sources; requires expensive, specialized laminating equipment; and in some instances delamination of the film occurs resulting in ineffective temperature control in designated surface areas.

The enhancer or receptor metallized material often times increases the heat surface temperature of the substrate material, e.g., paperboard, on which it is deposited to a point where the substrate material becomes discolored or charred lessening its esthetics. Where the metallized material is applied to plastic containers, the latter may bow, curl or melt, when subjected to the generated microwave, causing contamination of the accommodated food product or leakage of the food product from the container onto the floor of the microwave oven creating a clean-up problem for the user.

Where conventional printing inks are applied directly on the exterior surface of the container, for graphic or informational purposes, such inks may be adversely affected by the increased surface temperatures of the container causing same to melt and/or be transferred to the microwave oven floor creating not only a clean-up problem, but in some cases, actual bonding of the container to the oven floor.

Frequently, prior disposable microwave oven food product packages and receptacles embodying enhancer features required a combination of diverse materials and non-conventional methods of combining such materials to form a usable and practical structure. For example, numerous prior containers of this general type, such as disclosed in U.S. Pat. No. 4,641,005, utilize a film of polyethylene terephthalate (PET) commonly in a thickness of 0.48 gauge which is then vacuum metallized with aluminum. This material must be tightly controlled as to the amount of metallization applied (often measured and referred to as optical density, light transmission or OHMS per square inch). This metallized film must then be laminated to a more durable substrate, such as paper or paperboard, to prevent said film from biaxially shrinking during cooking which will cause the prior controlled amount of aluminum particles deposited on the film to gather more closely together thereby increasing the materials's actual and prior controlled optical density to a non-controlled state thereby creating possible malfunctions of the receptive material itself and the quality of the cooked food in direct contact therewith.

An additional concern in this laminating process of the metallized PET film to paper or paperboard, is in finding an adhesive that will maintain its integrity during laminating, handling and microwave oven heating and cooking.

Traditionally, this form of microwave oven receptive packaging remains costly not only due to the amount of materials which must be combined in order to achieve the desired end result, but also due to the fact that diverse component suppliers and processors are often times involved such as a film supplier, a metallizer, a laminator, a paperstock supplier, and paperboard converter.

SUMMARY OF THE INVENTION

Thus, it is an object of the invention to provide an improved food package of the type described which avoids all of the aforenoted shortcomings associated with prior food packages utilized in microwave ovens.

It is a further object to provide an improved, disposable food package of simple inexpensive construction wherein surface areas thereof provide the required enhanced heat or shielding for the accommodated food product when the latter remains within the package while being exposed to the microwaves generated within the oven.

It is a further object to provide an improved food package of the type described which utilizes metallized ink to provide the desired enhanced heat for the accommodated food product when exposed to microwaves without deleteriously affecting the substrate on which the ink is deposited.

It is a further object to provide an improved food package of the type described wherein the container in which the food product is accommodated may be formed utilizing conventional high speed equipment and conventional loading and set up procedures.

It is a still further object to provide an improved food package of the type described which is capable of accommodating a wide variety of food products and fulfilling the heating or cooking needs thereof when exposed to microwaves generated within a microwave oven.

It is a still further object to provide an improved food package suitable for microwave heating or cooking wherein predetermined surface areas of the package can simultaneously produce enhanced heat of different temperatures.

It is a further object to provide an improved food package of the type described which provides the desired degree of browning/crisping of the accommodated food product to achieve accustomed color, taste or texture thereof.

It is a still further object to provide an improved microwavable food package wherein metallized ink may be applied to predetermined surface area(s) to shield and protect portions of the food product against microwave heating.

Further and additional objects will appear from the description, accompanying drawings and appended claims.

In accordance with one embodiment of the invention a food package is provided for use in a microwave oven to cook, heat and/or thaw, the food product while accommodated within the package. The package includes a container in which is disposed the food product. Predetermined portions of the accommodated food product may require either enhanced heat; shielding against microwaves, or in certain instances may require enhanced heat while other portions simultaneously require shielding against the microwaves generated within the oven. Predetermined surface areas of the container adjacent designated portions of the accommodated product have deposited thereon various amounts of metallized ink. The metallized ink consists of a prescribed amount of metal particles suspended in an ink-like substance whereby, when the deposited metallized ink is exposed to the generated microwaves, either the desired enhanced heat or shielding is produced.

DESCRIPTION

For a more complete understanding of the invention reference should be made to the drawings, wherein.

FIG. 9 is a fragmentary enlarged vertical sectional view of a third embodiment of the improved food package wherein the latter includes an inner container in which the food product is accommodated and an outer container in which the inner container is disposed.

FIG. 10 is a perspective top view of the inner container of FIG. 9 without a cover therefor.

FIG. 11 is a top plan view of a blank from which at least a part of the outer container of FIG. 9 is formed and showing predetermined surface portions of the blank with metallized ink deposited thereon.

For purposes of clarification and to better understand the invention hereinafter described the thickness of the deposited metallized ink is greatly exaggerated in the accompanying drawings.

Figure 1:
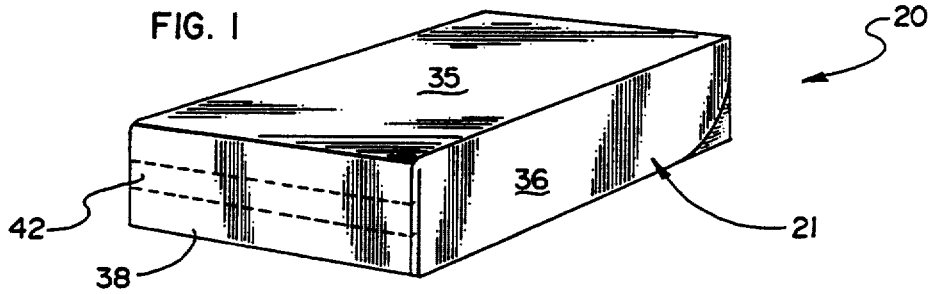
FIG. 1 is a perspective view of one embodiment of the improved food package in its initial unopened mode.
Figure 2:
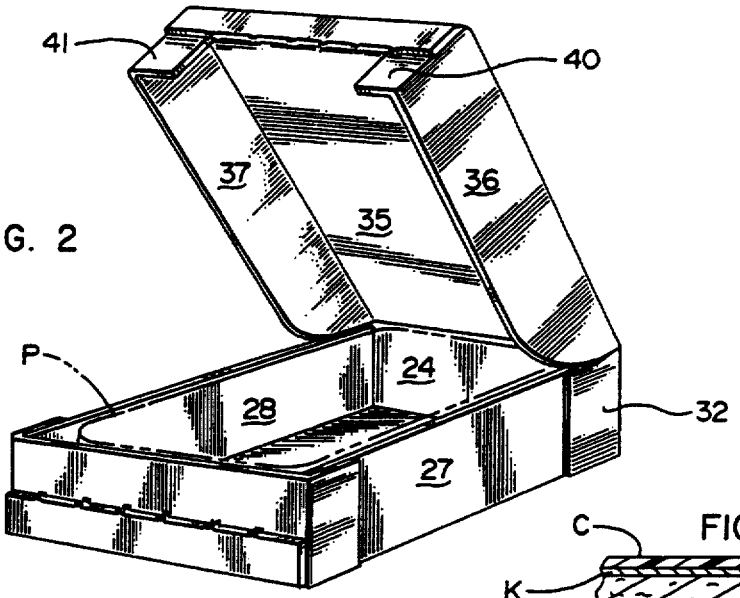
FIG. 2 is a similar to FIG. 1 but with a cover section thereof in an open mode thereby providing access to the accommodated food product, shown in phantom lines.
Figure 3A:
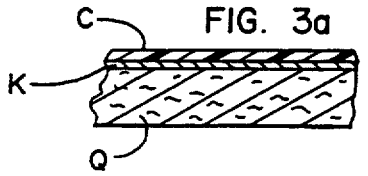
FIG. 3a is an enlarged fragmentary sectional view taken along line 3a—3a of FIG. 3.
Figure 3:
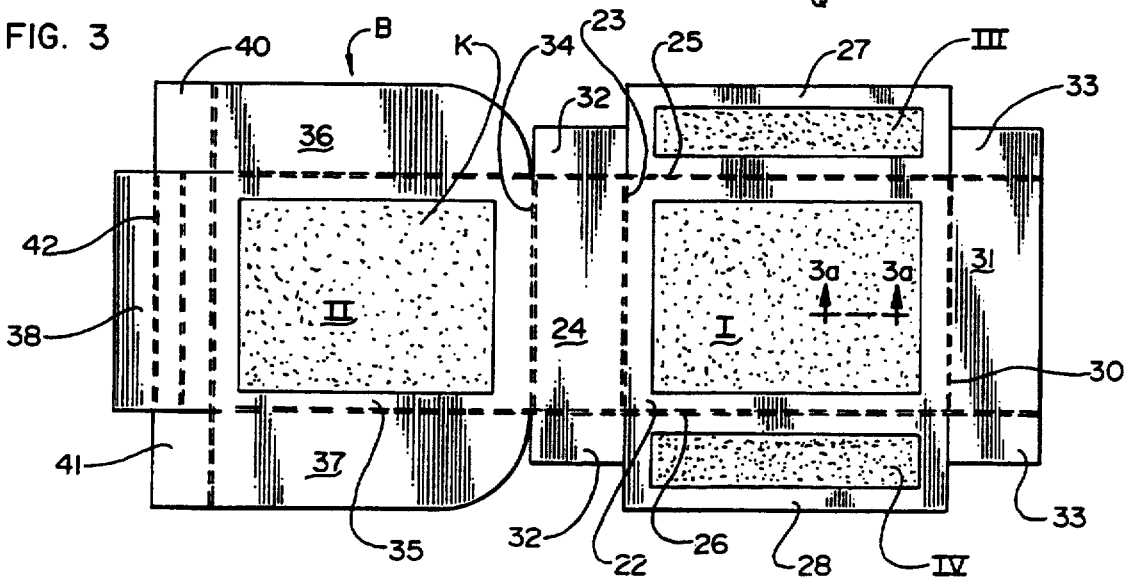
FIG. 3 is a top plan view of a blank of paperboard or similar material from which the container of the package shown in FIG. 1 is formed; the metallized ink being shown deposited on predetermined surface portions of the blank.
Figure 4:
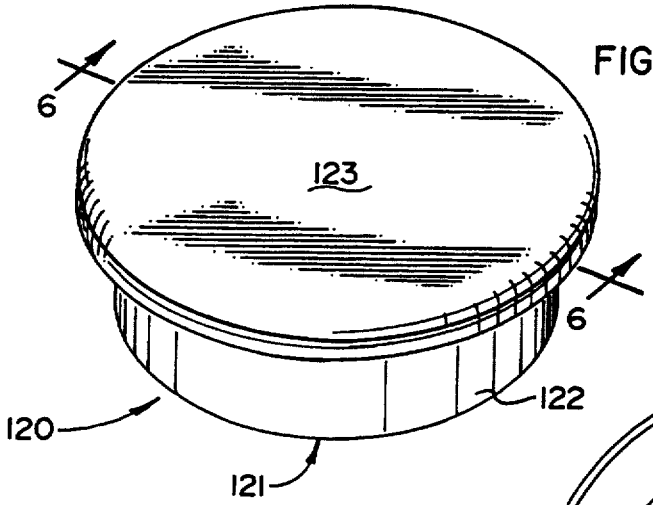
FIG. 4 is a perspective view of a second embodiment of the improved food package in an unopened mode.

Referring to FIGS. 1–3 a preferred embodiment 20 of the improved food package is illustrated. The package 20 includes a container 21 in the form of a folding carton. The container 21, as seen in FIG. 3, is formed from a blank B of heat resistant material pervious to microwaves (e.g. paperboard Q) and includes a bottom panel 22 which subtends and supportingly engages the underside of a food product P, accommodated within the container. Disposed to the left side of the bottom panel, as seen in FIG. 3, and connected thereto by foldline 23 is a rear panel 24 which is adapted to extend substantially vertically upwardly from the bottom panel 22 when the blank is set up to form container 21.

Connected by foldlines 25 and 26 to opposed peripheral portions of the bottom panel 22 are inner side panels 27 and 28, see FIG. 3. Connected by foldline 30 to the peripheral portion of the bottom panel opposite foldline 23 is an inner front panel 31.

Foldably connected to the opposite narrow ends of rear panel 24 and inner front panel 31 are end flaps 32 and 33, respectively, which are adapted to be secured to the outer surface of the inner side panels 27 and 28 whereby the inner front panel 31, the inner side panels 27 and 28, and the rear panel 24 are retained in vertical upright positions and coact to form a wall which delimits bottom panel 22 when the blank is set up to form the container 21.

Connected by foldline 34 to the peripheral portion of the rear panel 24 opposite foldline 23 is a top panel 35 which is adapted to assume a spaced, superposed relation with the bottom panel 22, when the container is in a closed mode, as seen in FIG. 1. Outer side panels 36 and 37 are foldably connected to opposed peripheral portions of the top panel 35 and are adapted to overlie the outer surfaces of the corresponding inner side panels 27, 28 and the end flaps 32, 33 secured thereto.

An outer front panel 38 is foldably connected to the peripheral portion of the top panel 35 opposite foldline 34. End flaps 40, 41 are foldably connected to outer side panels 36, 37 and secured to the interior of outer front panel 38 so as to retain the outer side panels 36, 37 and outer front panel 38 in depending relation with respect to the top panel 35. The outer front panel 38 may be provided with a conventional tear strip 42 which extends lengthwise across the panel 38.

Because the food product P accommodated in container 21 may require enhanced heat for certain portions thereof when the product is being heated or cooked by the microwaves generated within the microwave oven, not shown, surface portions I, II, III and IV of blank B have deposited thereon metallized ink K, see FIG. 3a. When the blank is set up to form the container 21 the surface portions I–IV will be disposed in close proximity or engage corresponding surface portions of the product requiring the desired enhanced heat.

The metallized ink embodies a controlled amount of metal particulates or particles (e.g. aluminum) which are suspended in an ink-type carrying substance. The actual amount of metal particles may vary according to the enhanced heat required and the intensity of the microwave energy generated within the oven and can be carefully controlled through standard formula measurements (i.e. parts per hundred on a volumetric basis). Where the metallized ink is to be printed on a paperboard substrate Q, the latter may, for example, be run through a standard offset printing press. The amount of metallized ink deposited on the paperboard will depend in part at least upon factors such as ink viscosity, speed of the press and the amount of ink lay down. Measuring the amount of deposition may be done through the use of a conventional densitometer and/or interchemical thickness gauge, the latter being of a type disclosed in U.S. Pat. No. 2,507,592. It has been found that there is a direct correlation between parts per hundred of metallization and densitometer reading thereby allowing accurate in-line printing controls. Where an interchemical thickness gauge is utilized it will accurately measure the metallized ink film thickness on the form roller, which through the printing process will directly transfer onto the printing plate, then onto the offset blanket and finally onto the intended paperboard surface Q.

Other substrates besides paperboard may be utilized provided they are pervious to microwaves; can be folded molded, or shaped to the desired configuration; are heat resistant; can withstand temperatures generated during microwave cooking cycle; and will not deleteriously affect the accommodated food product or the microwave oven in which the package is placed. Furthermore, the deposition of the metallized ink may be accomplished by means other than printing (e.g. spraying, brushing, dipping, etc.).

In addition to metallized ink, other more conventional inks may also be applied to the substrate for informational indicia, graphics or the like.

The surface portions I–IV of the blank B may have deposited thereon metallized ink of the same or different thicknesses and densities of suspended metal particulates or particles. For example, portion I may have a density of twenty two (22) parts per hundred; and the portions II–IV may have a density of eighteen (18) parts per hundred.

Where the metallized ink portions are in direct contact with the accommodated food product P or the bottom surface of the microwave oven, a protective coating C, not unlike a release coating or sealing agent, may be applied to the exposed surface of the metallized ink K, see FIG. 3a using conventional printing techniques. The coating C, when subjected to microwaves, prevents any transfer of the metallized ink to the product or oven surface, which might otherwise cause sticking of the container thereto.

The configuration and size of the container 21 and the number, location, size and shape of the surface areas on which the metallized ink is deposited may also vary over a wide range and will depend upon the type, size and shape of food product to be accommodated therein and the power output of the microwave oven in which the container is to be placed.

FIGS. 4–8 illustrate a second version of the improved food package 120 which includes a container 121 having a bowl 122 in which the food product P is disposed, and a lid 123 which is fit over the top of the bowl. The bowl may be formed of a molded pulp or suitable plastic material which is heat resistant, pervious to microwaves, will not deleteriously affect the accommodated food product and will retain its shape when subjected to a wide range of temperatures. Where the bowl is of molded pulp material, the surface thereof exposed to the food product may be provided with a suitable liner or coating which prevents direct contact of the food product with the pulp fibers.

The lid 123 may be formed of a variety of materials and in some instances might be a film or membrane having the periphery thereof sealed to the rim 122a of the bowl defining the top thereof. Normally a portion of the lid film is peeled back from the rim, or completely removed from the bowl, before the container is subjected to the microwaves.

Figure 5:
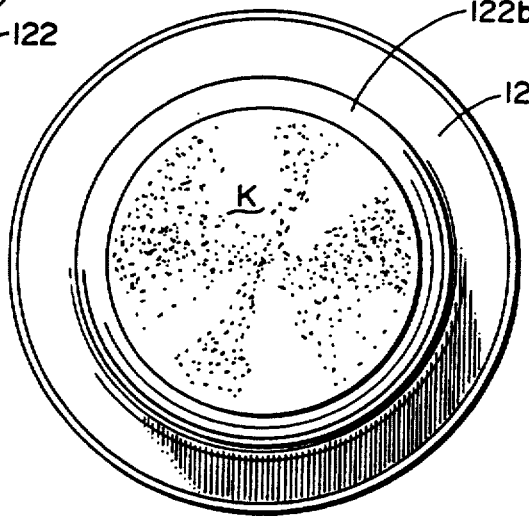
FIG. 5 is a bottom view of the package of FIG. 4 and showing the metallized ink deposited on a predetermined portion of the bottom exterior surface of the package.
Figure 6:
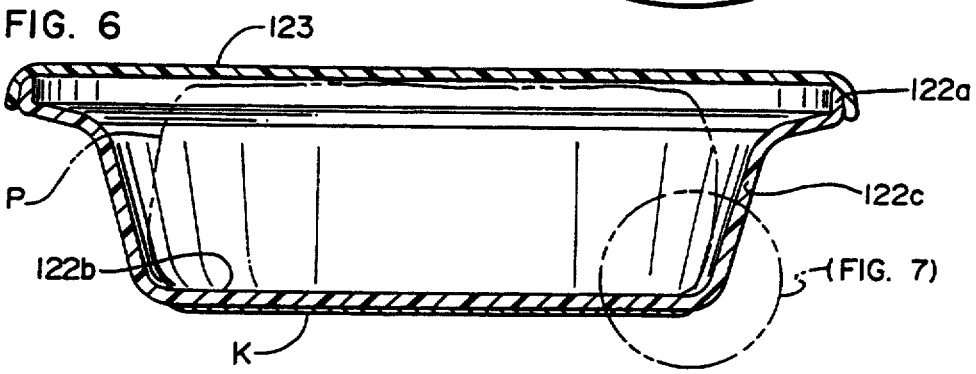
FIG. 6 is an enlarged sectional view taken along line 6—6 of FIG. 4.
Figure 7:
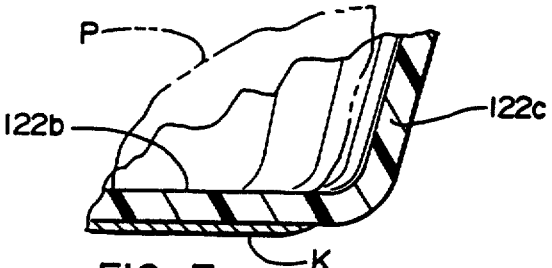
FIG. 7 is an enlarged fragmentary portion of the package of FIG. 6 shown included within the dotted circle indicated thereon.

As seen in FIGS. 5 and 6, the exterior of the bottom 122b of the container has deposited thereon a metallized ink K which will cause enhanced heat to occur in the vicinity of the container bottom. Such enhanced heat might be desirable where the lower portion of the accommodated food product includes a sauce or cooking oil.

Figure 8:
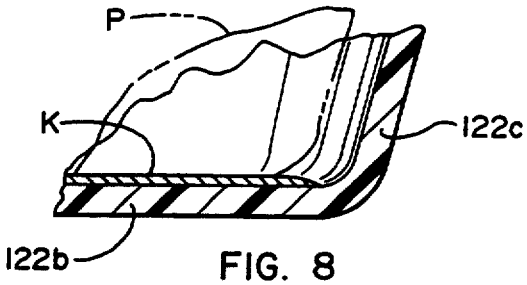
FIG. 8 is similar to FIG. 7 but showing the metallized ink deposited on the bottom interior surface of the container.

In lieu of having the metallized ink deposited on the exterior bottom surface of the container, it may be deposited on the interior bottom surface, see FIG. 8. In some instances, it might be desirable to deposit the metallized ink on the side wall 122c of the container.

FIGS. 9–11 illustrate a third version of the improved food package 220 and the various components thereof. Package 220 is particularly suitable for the simultaneous packaging of a variety of food items comprising, for example, a meat, poultry or fish entree; potato, rice or noodles; and a vegetable. Such food packaging is popularly known as a frozen TV dinner.

Package 220 includes a thin-walled compartmented tray-like container 221 formed of a molded pulp or plastic material having characteristics like those previously described. The container is provided with three compartments, X Y and Z, each intended to accommodate a different food product of the type previously noted. Initially, the top of the container may be covered by a suitable plastic film or membrane which may be perforated, partially peeled back or entirely removed before the heating or cooking operation commences.

The tray-like container 221 is disposed within an outer container 222 which may include a bottom section 223 and a telescoping top section 224. Both the top and bottom sections may be formed from blanks of paperboard or similar material. The bottom section 223, as illustrated, is formed from a blank BB, see FIG. 11, the latter having a bottom panel 223a which supportingly engages and subtends container 221. Foldably connected to opposing peripheral portions of the bottom panel are end panels 223b, and side panels 223c, respectively. End flaps 223d may be foldably connected to opposite ends of either the side panels, as shown, or the end panels. Deposited on predetermined areas I',II' and III' of the interior surface of the bottom panel 223a is a metallized ink of the type previously described. The locations of areas I'-III' correspond substantially to the locations of the bottom surfaces of the compartments X, Y and Z, respectively, of the tray-like container 221, when the latter is disposed within the outer container 222, as shown in FIG. 9. The densities of the metallized ink deposited on each of the surface areas I'-III' may vary and will depend upon the type of food product accommodated in each compartment. While the metallized ink is shown deposited on the bottom panel 223a of the bottom section 223 it is not intended to be limited thereto, but may be deposited on the end and side panels 223b, and 223c, as well, and on the interior surface of the top panel 224a of the top section 224. The shape, size and number of metallized ink deposits on the bottom panel 223a of the bottom section will depend on the number, shape and location of the compartments formed in the tray-like container.

In lieu of the metallized ink being deposited on the bottom panel of the bottom section, it may be deposited directly onto either the exterior or interior surface of a predetermined number of the compartments. Furthermore, in certain instances it may be desirable that either the entire interior or exterior surface of the container have deposited thereon the metallized ink.

As previously mentioned, in certain containers for food products, it is desirable, or necessary, that portions of the accommodated food product be shielded from microwaves while other portions of the food product be exposed to the microwaves for normal heating or enhanced heating. Shielding of predetermined portions of the accommodated food product may be accomplished by applying to areas of the container proximate the predetermined portions of the food product, a metallized ink having a high level or concentration of metal particulates which will cause the microwaves to be reflected rather than absorbed thereby enabling the predetermined portions to remain relatively cool instead of heating up when the microwaves are being generated within the oven. The amount of shielding desired may be achieved by varying the parts per hundred of particulates—e.g., 60 parts/hundred may determined a shielding factor of 40% whereas 85 parts/hundred may determine a shielding factor of 100%.

Thus, an improved food package for use in a microwave oven has been provided which utilizes a pattern of metallized ink deposited on predetermined surfaces of certain of the package components in order to obtain areas of enhanced heat or shielding when the package is subjected to microwaves. The deposition of the metallized ink can be carefully controlled and high speed conventional equipment can be utilized in applying the ink to various components of the package. Metallized ink having different densities may be deposited on certain packages so that different enhanced heat temperatures or variations in shielding capabilities can be simultaneously attained when the package is subjected to the microwaves generated in the oven. The metallized ink may be applied by printing spraying, brushing or dipping onto components which vary in size and shape over a wide range without adversely affecting the volumetric capacity or structural integrity of the component. The improved food package facilitates microwave heating and cooking of the accommodated food product and the components thereof are inexpensive and may be readily discarded when the heating and/or cooking has been completed.

I claim:

[1. A food package for heating or cooking a food product accomodated therein in a microwave oven, the accommodated food product having at least one predetermined portion thereof requiring enhanced heat during the heating or cooking of the product, said package comprising a container for the food product formed of a heat resistant material pervious to the microwaves generated within the oven, said container having a surface area of the material in proximity to the predetermined portion of the accommodated food product, said area having printed directly on the material surface a metallized ink, the latter having a predetermined amount of metal particles suspended in an ink-like substance, whereby when said metallized ink is exposed to generated microwaves, the printed surface area produces the requirement enhanced heat for the one predetermined portion of the accommodated food product.]

[2. The food package of claim 1 wherein the accommodated food product has a plurality of separate predetermined portions requiring enhanced heat during heating or cooking of the food product in the microwave oven, said container having a corresponding number of surface areas on which is directly printed the metallized ink for effecting the required enhanced heat.]

[3. The food package of claim 2 wherein the metallized ink printed on certain surface areas of the container has an amount of suspended metal particles which is different from the amount of suspended metal particles in the metallized ink printed on other surface areas thereby effecting enhanced heat of different temperatures when the food product is subjected to the microwaves generated within the oven.]

[4. The food package of claim 1 wherein an exposed surface of the printed metallized ink is coated with a material having a non-stick surface characteristic for the purpose of direct food contact protection.]

[5. The food package of claim 1 wherein the metallized ink is printed on the container surface in a predetermined pattern.]

[6. The food package of claim 1 wherein the metallized ink is printed on a predetermined area of an interior surface of the container.]

[7. The food package of claim 1 wherein the metallized ink is printed on a predetermined area of an exterior surface of the container.]

[8. A disposable container for accommodating a food product having at least one predetermined portion requiring enhanced heat when the food product is heated or cooked within a microwave oven, said container being formed of a heat resistant material pervious to microwaves, said material having a surface area on which is directly printed a metallized ink, the latter having a predetermined amount of metal particles suspended in an ink-like substance, said surface area adapted to be in proximity to the predetermined portion of the food product and provide the required enhanced heat therefor when the food product is subjected to the microwaves generated within the oven.]

[9. The disposable container of claim 8 wherein a plurality of surface areas are provided on which is printed the metallized ink, each surface area adapted to be in proximity to a corresponding predetermined portion of the accommodated food product which requires enhanced heat when the food product is being heated or cooked by microwaves generated in the oven.]

[10. The disposable container of claim 9 wherein the metallized ink printed on certain surface areas of the container material has an amount of suspended metal particles which is different from the amount of suspended metal particles in the metallized ink printed on the remaining surface areas.]

[11. The disposable container of claim 8 wherein the area thereof on which the metallized ink is printed is formed on an interior surface of the container and is adapted to be in contact with the accommodated food product.]

*12. A food package for heating or cooking a food product accommodated therein in a microwave oven, the accommodated food product having at least a first predetermined portion thereof requiring enhanced heat during the heating or cooking of the product, and at least a second predetermined portion thereof requiring shielding from microwaves during the heating or cooking of the product, said package comprising a container for the food product formed of a heat resistant material which is capable of retaining its shape when subjected to heating or cooking temperatures and is pervious to the microwaves generated within the oven, said container having first and second surface areas of the material in proximity to the said first and second predetermined portions of the accommodated food product, respectively, said first area having printed directly on the material surface a metallized ink, the latter having a predetermined amount of metal particles suspended in an ink-like substance, whereby when said metallized ink is exposed to generated microwaves, the printed surface area retains its shape and produces the required enhanced heat for the said first predetermined portion of the accommodated food product, said second predetermined area having a metallized ink having a large amount or concentration of metal particles which will cause the microwaves to be reflected enabling the second predetermined portion to remain relatively cool instead of heating up when the microwaves are being generated within the oven.*

*13. The food package of claim 12 wherein the accommodated food product has a third predetermined portion requiring normal microwave heating during the heating or cooking of the product, said container having a third surface area in proximity to said third predetermined portion of the accommodated food product, said third area devoid of metallized ink.*

*14. The food package of claim 12 wherein the accommodated food product has a plurality of separate first predetermined portions requiring enhanced heat during heating or cooking of the food product in the microwave oven, said container having a corresponding number of first surface areas on which is directly printed the metallized ink for effecting the required enhanced heat.*

*15. The food package of claim 14 wherein the metallized ink printed on a certain first surface area of the container has an amount of suspended metal particles which is different from the amount of suspended metal particles in the metallized ink printed on another first surface area thereby effecting enhanced heat of different temperatures when the food product is subjected to the microwaves generated within the oven.*

*16. The food package of claim 14 wherein the accommodated food product has a plurality of second predetermined portions requiring shielding from microwaves during the heating or cooking of the product, said container having a corresponding number of second surface areas having a metallized ink with a large amount or concentration of metal particles for causing the microwaves to be reflected.*

*17. The food package of claim 16 wherein the metallized ink of a certain second surface area of the container has an amount or concentration of metal particles which is different from the amount or concentration of metal particles of another second surface area thereby effecting shielding to different degrees when the food product is subjected to the microwaves generated within the oven.*

*18. The food package of claim 12 wherein the accommodated food product has a plurality of second predetermined portions requiring shielding from microwaves during the heating or cooking of the product, said container having a corresponding number of second surface areas having a metallized ink with a large amount or concentration of metal particles for causing the microwaves to be reflected.*

*19. The food package of claim 18 wherein the metallized ink of a certain second surface area of the container has an amount or concentration of metal particles which is different from the amount or concentration of metal particles of another second surface area thereby effecting shielding to different degrees when the food product is subjected to the microwaves generated within the oven.*

*20. A disposable container for accommodating a food product having at least a first predetermined portion requiring enhanced heat and at least a second predetermined portion requiring shielding from microwaves when the food product is heated or cooked within a microwave oven, said container being formed of a heat resistant material which is capable of retaining its shape when subjected to heating or cooking temperatures and is pervious to microwaves, said material having a first surface area on which is directly printed a metallized ink, the latter having a predetermined amount of metal particles suspended in an ink-like substance, said first surface area adapted to be in proximity to said first predetermined portion of the food product and provide the required enhanced heat therefor while retaining its shape when the food product is subjected to the microwaves generated within the oven, and said material having a second surface area on which is directly printed a metallized ink having a large amount or concentration of metal particles which will cause the microwaves to be reflected, said second surface area adapted to be in proximity to said second predetermined portion of the food product and provide the required shielding therefor when the food product is subjected to the microwaves generated within the oven.*

*21. The disposable container of claim 20 further having a third surface area adapted to be in proximity to a third predetermined portion of the food product requiring normal microwave heating during the heating or cooking of the product, said third area devoid of metallized ink.*

*22. The disposable container of claim 20 further having one or more other surface areas adapted to be in proximity to a corresponding one or more other predetermined portions of the food product requiring respectively one or more degrees of enhanced heat or shielding, said one or more other areas having metallized ink in such amounts or concentrations for effecting the required enhanced heat or shielding.*

* * * * *